(12) United States Patent
Szewczyk

(10) Patent No.: US 8,225,197 B1
(45) Date of Patent: Jul. 17, 2012

(54) RENDERING APPROXIMATE WEBPAGE SCREENSHOT CLIENT-SIDE

(75) Inventor: Boleslaw Szewczyk, Warsaw (PL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/245,659

(22) Filed: Sep. 26, 2011

Related U.S. Application Data

(63) Continuation of application No. 13/169,508, filed on Jun. 27, 2011.

(30) Foreign Application Priority Data

Jun. 22, 2011 (PL) .......................... 395376

(51) Int. Cl.
*G06F 17/00* (2006.01)

(52) U.S. Cl. ...................................... 715/241

(58) Field of Classification Search ................... 715/234, 715/235, 236, 237, 238, 240, 241
See application file for complete search history.

(56) References Cited

U.S. PATENT DOCUMENTS

| | | | |
|---|---|---|---|
| 7,325,188 B1* | 1/2008 | Covington et al. ............ | 715/234 |
| 7,395,266 B2* | 7/2008 | Ito et al. ................................ | 1/1 |
| 7,900,149 B2 | 3/2011 | Hatcher et al. | |
| 2005/0027820 A1* | 2/2005 | O'Laughlen et al. .......... | 709/217 |
| 2009/0092134 A1* | 4/2009 | Herrera Schuvab .......... | 370/389 |
| 2010/0094860 A1* | 4/2010 | Lin et al. ........................ | 707/709 |
| 2010/0211865 A1* | 8/2010 | Fanning et al. ............... | 715/234 |
| 2010/0325129 A1* | 12/2010 | Ahuja et al. ................... | 707/759 |
| 2011/0066636 A1* | 3/2011 | Guido et al. ................... | 707/769 |
| 2011/0066957 A1* | 3/2011 | Prats et al. ..................... | 715/753 |
| 2011/0145694 A1 | 6/2011 | Graves et al. | |
| 2011/0258532 A1* | 10/2011 | Ceze et al. ..................... | 715/234 |

* cited by examiner

*Primary Examiner* — Laurie Ries
(74) *Attorney, Agent, or Firm* — Sterne, Kessler, Goldstein & Fox P.L.L.C.

(57) ABSTRACT

Methods, systems, and apparatuses, including computer programs encoded on a computer storage medium, for rendering an approximate webpage screenshot client-side are disclosed. A system may receive an indication to render a screenshot of a webpage presented on the client device, and create a canvas at the client device. The system may traverse a document object model (DOM) of the webpage, whereby for each of one or more nodes in the DOM, the system may identify a property of a respective node and render data in the respective node on the canvas based on the property.

14 Claims, 6 Drawing Sheets

US 8,225,197 B1

RENDERING APPROXIMATE WEBPAGE SCREENSHOT CLIENT-SIDE

CROSS-REFERENCE TO RELATED APPLICATIONS

The present application is a continuation of U.S. application Ser. No. 13/169,508 filed Jun. 27, 2011, which claims priority to co-pending Polish Patent Application No. P395376, filed Jun. 22, 2011, both of which are incorporated herein by reference in their entireties.

BACKGROUND

1. Field

This invention relates generally to rendering approximate webpage screenshots.

2. Background

Capturing screen shots is not new in the world of computing. There have been many techniques used to capture what is displayed on a user's local device, such as pressing the "Print Screen" button on the typical computer keyboard. Many of these techniques however are not sufficient when one desires to capture only a screenshot of a particular application page, such as a webpage the user is viewing (rather than the entire viewing area as may be displayed in a user's monitor). While currently there are techniques for capturing screen shots of web pages, these techniques often require that the user install an additional application, extension, or other code to capture the image that the user is viewing.

Amongst the problems with these approaches beyond the additional time it takes for the user to install whatever code is necessary to capture the screenshot is that many users have become increasingly wary of installing such applications or code onto their computers, fearful they may unintentionally download infected code that may be malware. As a result, rather than capturing the screenshot of the webpage, the user will often forego the process of capturing the screenshot altogether. This could be detrimental, for example, to a website host who may desire that a screenshot is captured of a webpage the user is viewing so that the host may have a better idea of what problems a user may be experiencing.

BRIEF SUMMARY

Methods, systems, and computer program products for rendering an approximate webpage screenshot client-side are disclosed herein.

According to an example embodiment, a computer-implemented method is disclosed. An indication to render a screenshot of a webpage presented on a client device may be received at the client device. A canvas may be created at the client device. A document object model (DOM) of the webpage may be traversed. For each of one or more nodes in the DOM: a property of a respective node may be identified and data in the respective node may be rendered on the canvas based on the property.

According to an example embodiment, a computer storage medium encoded with a computer program is disclosed, the program comprising instructions that when executed by one or more computers cause the one or more computers to perform operations. An indication to render a screenshot of a webpage presented on the client device may be received at a client device. A canvas may be created at the client device. A document object model (DOM) of the webpage may be traversed. For each of one or more nodes in the DOM: a property of a respective node may be identified, and data in the respective node may be rendered on the canvas based on the property.

According to an example embodiment a system comprising one or more computers is disclosed. A computer-readable medium may be coupled to the one or more computers having instructions stored thereon which, when executed by the one or more computers, cause the one or more computers to perform operations. An indication to render a screenshot of a webpage presented on the client device may be received at a client device. A canvas may be created at the client device. A document object model (DOM) of the webpage may be traversed. For each of one or more nodes in the DOM a property of a respective node may be identified, and data in the respective node may be rendered on the canvas based on the property.

Other embodiments of this aspect include corresponding systems, apparatus, and computer programs, configured to perform the actions of the methods, encoded on computer storage devices. Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

Figure 1:
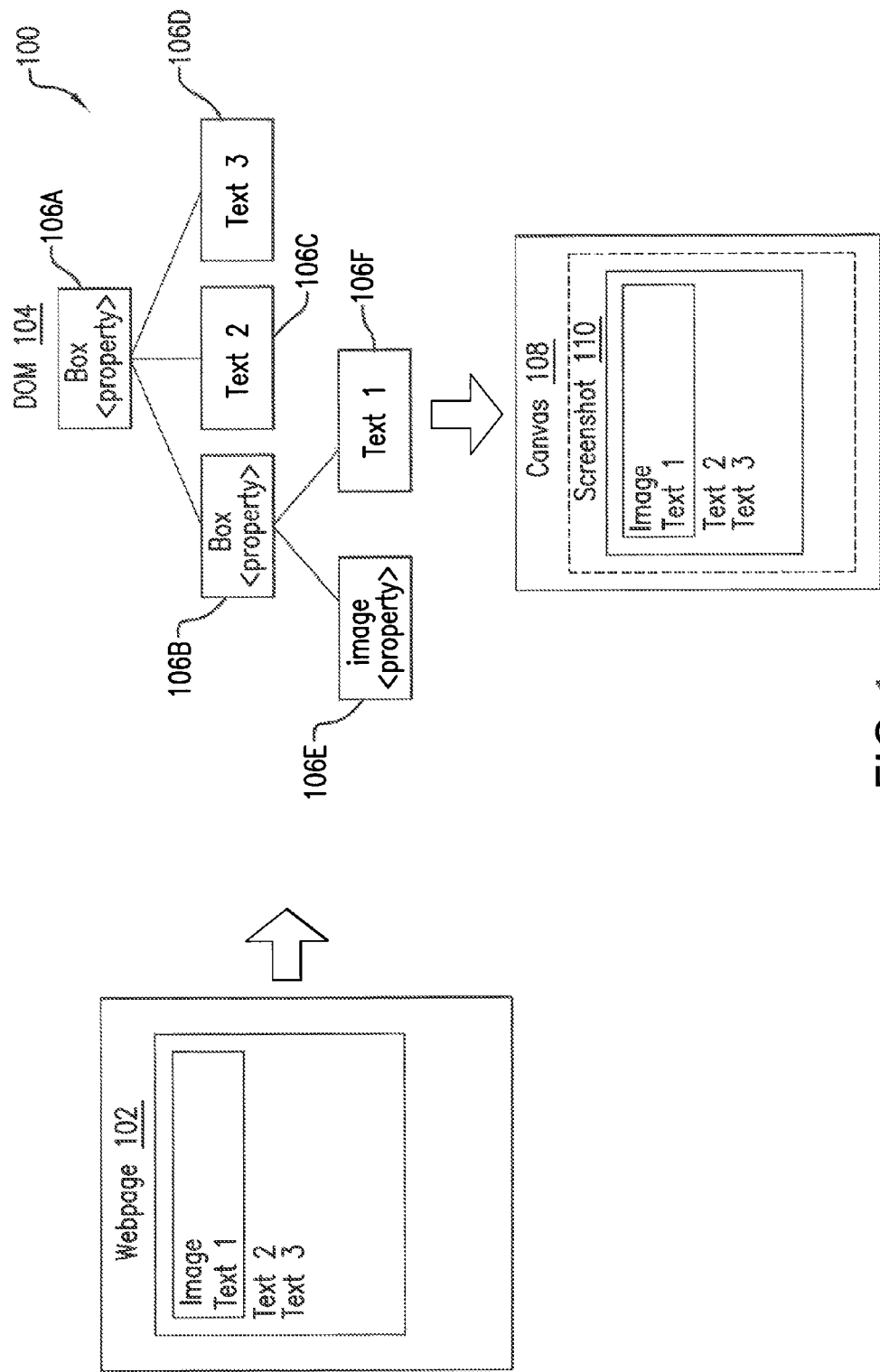
FIG. 1 illustrates a process for rendering an approximate webpage screenshot, according to an example embodiment.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to affect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Disclosed herein is a system for rendering an approximate webpage screenshot client-side. A screenshot may include any image taken to record the visible items on a user's screen, monitor or other display device, or portion thereof. The embodiments disclosed herein may capture the contents of the pixels that are rendered for a user. For example, if a user is viewing a webpage (or other application), the user and/or the webhost may desire that the user captures a screen shot of only that which the user is seeing on the webpage.

There are many reasons why it may be beneficial to have a screenshot of a particular webpage or website. For example, screenshots may be used by users to explain particular features of an application. Screenshots may also be useful to archive the current state of a webpage, as well as being useful in troubleshooting problems with a website. In troubleshooting a website or other web-enabled application, the content provider may desire that a screenshot be taken of the user's environment to more easily identify and/or resolve the user's problem.

In troubleshooting a website, the website host may then desire to make the process of taking a screenshot as easy and as seamless for the user as possible. For example, the content provider would prefer to be able to render screenshots of the user's environment without requiring the user to download and install any additional code. Because installing additional code may be enough reason for many users to avoid or abandon the troubleshooting process altogether. Many users may, for example, be wary of downloading unknown or additional code onto their machines because they do not want to unintentionally install malware on their machines.

FIG. 1 illustrates an example 100 for rendering an approximate webpage screenshot on a client-device, according to one embodiment. In one embodiment, a webpage may be selected for which a screenshot may be captured. The webpage may be rendered based on a document object model (DOM) associated with the webpage. The DOM may include nodes that correspond to one or more screen elements appearing in the webpage.

To render an approximate screenshot of the webpage, the DOM may be traversed to identify and collect information about the screen elements appearing in the webpage. Then, as the nodes of the DOM are being traversed, the corresponding screen elements may be rendered in a canvas, thus resulting in an approximate webpage screenshot being rendered. According to an example embodiment, the screen shot rendering may be done on the client-side without requiring a client device or user to download or install additional code for capabilities that may not already be supported by the client's or user's browser.

A webpage 102, as shown in the example 100, may include any arrangement of visual elements viewable through a browser. The webpage 102 may be viewable by a user of a computer, such as a laptop, desktop or tablet computer, or through a mobile phone. The webpage 102 may include any varying number of visual elements, including text and images (as shown in the exemplary webpage 102). The webpage 102 as discussed herein may include other elements or nodes including, but not limited to, text and image elements, such as form elements, links, videos, frames/iframes containing other documents or webpages, active elements. Herein text and images are used as examples of elements, but one skilled in the art will recognize that the embodiments described herein are not limited to only text and image elements or nodes. The webpage 102 is thought to include any page(s) of a website accessible through a network such as an intranet or the Internet.

The webpage 102 may correspond to a document object model (DOM) 104. The DOM 104 may include any convention for representing the objects that may be rendered in the webpage 102. According to an example embodiment, the DOM 104 may include a cross-platform, language-independent convention for interacting with objects in HTML, XHTML and XML documents.

The DOM 104 may include any number of DOM nodes 106A-F that correspond to one or more visual elements (e.g., characteristics, nodes or other features) of the webpage 102. In the example embodiment shown in FIG. 1, the nodes 106A and 106B may include Box elements which may include any visual element that may be rendered in the webpage 102. Or for example, the box elements may include a container or storage indicating that several elements are grouped together in the rendering of a webpage. For example, the box 106B may group together nodes 106E and 106F.

The text nodes 106C, 106D and 106F may include or correspond a text element that corresponds to text rendered on the webpage 102, while the DOM node 106E may include an image element that corresponds to an image rendered on the webpage 102. The term 'element' when used herein is used to capture any characteristic of a webpage 102 that may be represented in a DOM 104, and may include elements and/or nodes as associated with the text, images and/or other features. According to an example embodiment, the DOM nodes 106A-F may be arranged in a tree format.

As shown in the system 100, the DOM nodes 106A-F may include some property that is associated with the particular DOM node. The property may be used to determine how, when and/or where to render the corresponding screen element on the webpage 102. The properties may include a size, border, location, font, placement or other properties of the element. For example, the property for DOM node 106B may indicate the font of the text to be "Times New Roman", the size to be "12", the text is 'bolded and underlined' and the text is 'left justified' within a text box that has a height of 65 and a width of 60. According to an example embodiment, the properties may include cascading style sheet (CSS) properties. The CSS properties may describe the presentation of the webpage 102. In another example embodiment, it may be that a text nodes 106C, 106D and 106F, for example, may only include text and the properties that define how the text is to be rendered may be included with another element (not shown) associated with the text nodes. Other example DOMs 104 may include different nodes 106A-F and arrangements.

A canvas 108 may include an element or region where a screenshot 110 is rendered. The canvas 108 may include a drawable region in which the screen elements (as they correspond to the DOM nodes 106A-F) may be rendered. The canvas 108, according to an example embodiment may be rendered in a browser. According to an example embodiment, the canvas 108 may include a canvas element of the hyper-text markup language (HTML). The canvas element may allow dimensions of the canvas 108 to be specified and elements drawn using function calls accessible through client-side code or a client-side scripting language, such as ECMAScript (European Computer Manufacturers Association). Example client-side scripting languages include, but are not limited to, Jscript, VBScript and JavaScript. One skilled in the art will recognize that other client-side scripting languages or code may be used with the embodiments described herein.

Most browsers on which the webpage 102 is viewed may support the canvas functionality, such that implementing the canvas 108 with the canvas element of HTML (HTML as used herein may include any version of HTML that includes the canvas functionality described herein, including HTML 5 and future versions of HTML), for example, may the screenshot 110 of the webpage 102 (including a portion thereof) to be rendered without downloading or otherwise installing any additional plug-ins or other elements into their browser. According to example embodiments, the canvas 108 may include an HTML CanvasElement or FlashCanvas. According to an example embodiment, FlashCanvas can be a library that adds HTML canvas support to a browser or other webpage viewer. FlashCanvas may, for example, render shapes and images using a Flash application programming interface (API).

The screenshot 110 may include an approximate screenshot of the webpage 102. As referenced above, the screenshot 110 may include a rendering of the DOM nodes 106A-F of the webpage 106. Through the process of rendering the DOM nodes 106A-F, rather than capturing an exact image of the webpage 102, the screenshot 110 may be an approximate representation or approximate screenshot of the webpage 102. As referenced above however, the screenshot 110 may be advantageous such that no additional applications, plug-in or other code may be necessary to capture or render and then display the screenshot 110 (of the webpage 102).

Figure 2:
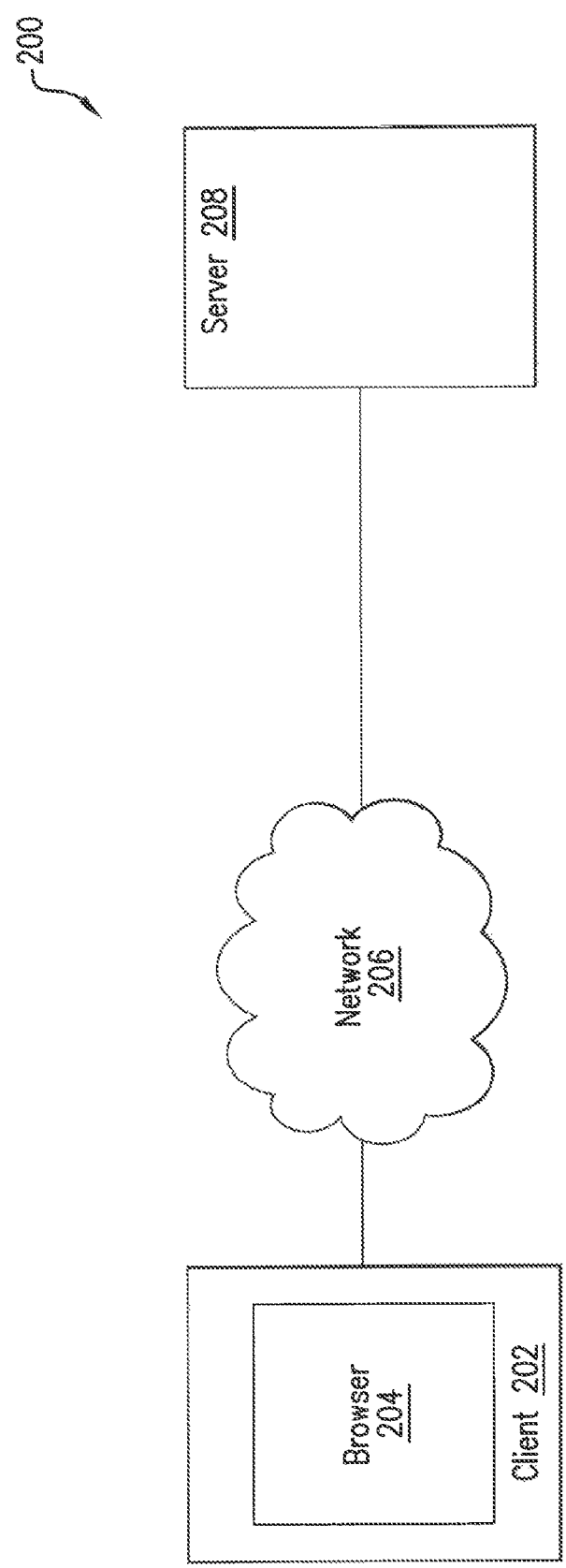
FIG. 2 is a block diagram of an exemplary client/server communication network exchanging data.

FIG. 2 is a block diagram of an exemplary client/server communication network exchanging data. The system 200 may include client (device) 202 comprising browser 204, which may be communicatively coupled to a server 208 over one or more networks 206.

The client 202 may include any computer, processor or other device on which a user may access a browser 204. The client 202 may include, for example, a laptop or mobile phone on which a user may view webpages (102) on the browser 204. Examples of the embodiments for the client 202, the server 208, and methods or any parts or function(s) thereof may be implemented using hardware, software modules, firmware, tangible computer readable or computer usable storage media having instructions stored thereon, or a combination thereof and may be implemented in one or more computer systems or other processing systems.

According to an example embodiment, the browser 204 may include any device, application or module that enables a user or computer to navigate and/or retrieve data from another data source, typically over a network. The browser 204 may include, but is not limited to, any conventional web browser such as those that are widely available, such Chrome®, Safari®, Firefox®, and/or Internet Explorer®.

The browser 204 may include or otherwise be capable of rendering the text and images of a webpage that may be encoded within HTML and a scripting language such as JavaScript®. The browser 204 may be configured to render the webpage 102 from the DOM 104 onto the canvas element 108. According to a further embodiment, the browser 204 may also be configured to use any number of protocols, known now or developed in the future, including protocols such as HTTP, FTP, and underlying protocols such as TCP/IP or UDP.

The browser 204 may further communicate with an input (not shown) to allow a user to input data, commands, or otherwise provide other control information to the browser 204. The browser 204 may request content from the server 208, based on user input. The server 208 may respond to the request by providing content back to the browser 204 and the client 202 via the network 206. The browser 204 may also be configured to retrieve content from the server 208 without user intervention. For example, the server 208 may push and/or update data in the browser 204.

The network 206 may include any telecommunications or computer network that communicatively couples the client 202 to the server 208. In an example embodiment, the network(s) 206 may include any type of data network or combination of data networks including, but not limited to, a local area network (LAN), a medium area network, or a wide area network such as the Internet. The network 206, for example, may be a wired or wireless network that allows the client 202 and the server 208 to communicate with each other. The network 206 may further support world-wide-web (e.g. Internet) protocols and services. For example, the client 202 may include mobile phone or tablet PC that is wirelessly connected to the Internet and the server 208 through a service provider that maintains the network 206.

The server 208 may include a server that provides the webpage 104, or a portion thereof, to the client 202 over the network 206. For example, using the client device 202, a user may browse a website via the browser 204, the data of the website may be provided from the server 208 over the network 206 that connects the client 202 to the Internet. The website may include one or more webpages, including the webpage 102 as hosted by, or otherwise provided by the server 208. The server 208 may include one or more web servers, data servers and/or other servers that include information used to generate the webpage 102. According to an example embodiment, the server 208 may include a plurality of servers of a server farm or other network and/or service provider host.

The server 208 may provide content (e.g., web pages, applications (or "apps"), audio, video, etc.) that may be retrieved or otherwise accessed by the client 202 over the network 206. The content accessed by the client 202 may be viewed, used, displayed or otherwise disseminated via the browser 204.

In an example embodiment, the client 202 and the server 208 may each be implemented on a computing device. Such a computing device may include, but is not limited to, a personal computer, mobile device such as a mobile phone, workstation, tablet computer, embedded system, game console, television, set-top box, or any other computing device that can support web browsing. Such a computing device may include, but is not limited to, a device having a processor and memory for executing and storing instructions. Such a computing device may include software, firmware, and hardware. The computing device may also have multiple processors and multiple shared or separate memory components. Software may include one or more applications and an operating system. Hardware can include, but is not limited to, a processor, memory and graphical user interface display. An optional input device, such as a mouse or touch screen, may be used. According to an example embodiment, the system 100 functionality as discussed above, may be performed at least in part on the client 202 and/or the server 208, communicating over the network 206.

Figure 3:
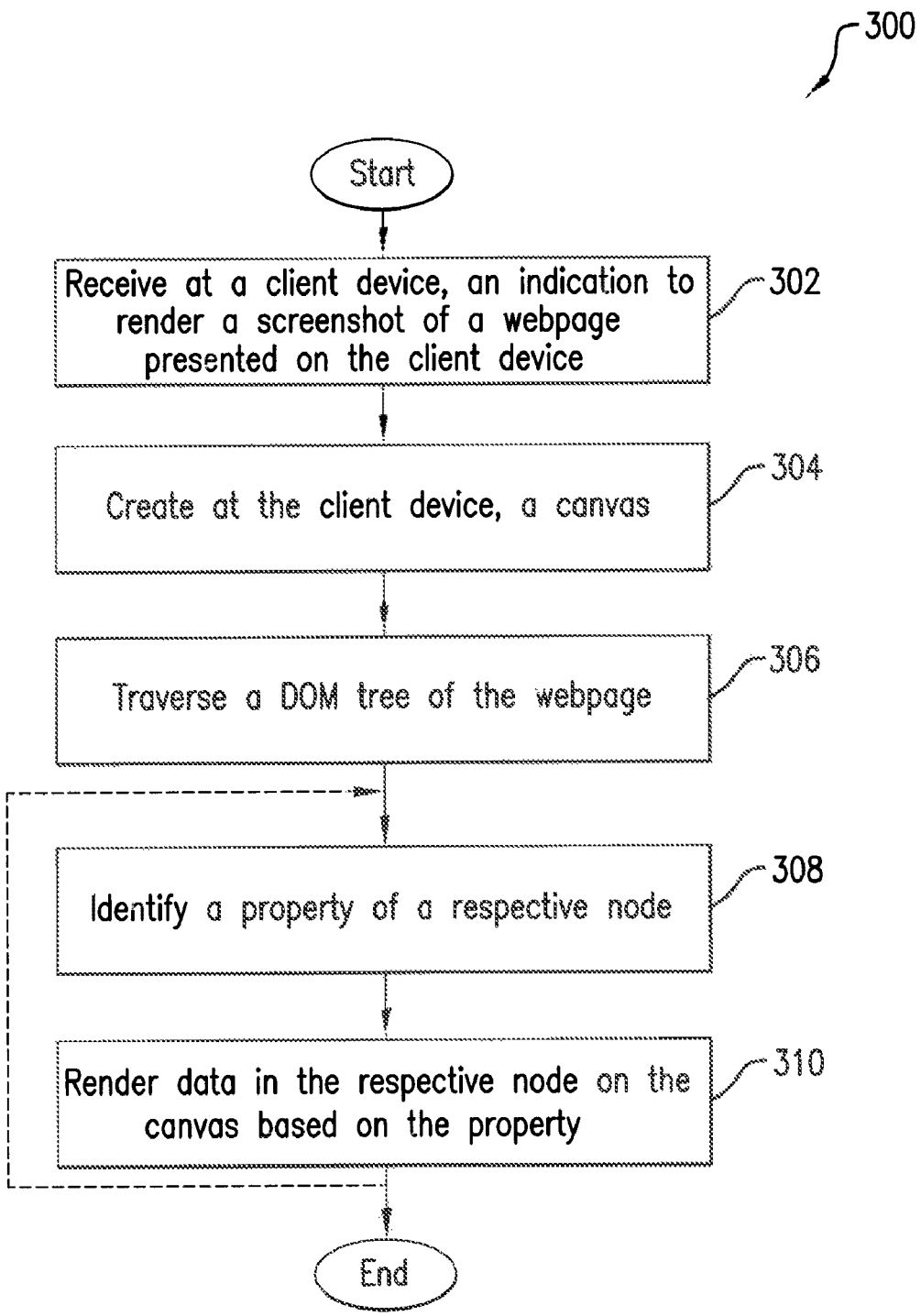
FIG. 3 is a flow diagram of a method for rendering an approximate screenshot according to an example embodiment.

FIG. 3 is a flow diagram of a method 300 for rendering an approximate screenshot according to an example embodiment. At step 302, after a start step, an indication to render a screenshot of a webpage presented at a client device may be received at the client device. For example, in reference to FIGS. 1 and 2, a user at the client 202 may be browsing the Internet using the browser 204. The user may be viewing the webpage 102 when an error occurs on the webpage 102. Then for example, in response to detecting the error, the hosting server 208 may indicate that a screenshot of the webpage 102, including the error, is to be rendered.

At step 304, a canvas may be created at the client device. For example, the client 202 may create a canvas element 108 at the client 202. According to an example embodiment, the server 208 may indicate the height and width, or other size dimensions, of the canvas 108 upon creation. In another example embodiment, the client 202 and/or the browser 204 operating on the client 202 may have been previously loaded with code that is configured to render the screenshot 110 upon the occurrence of an error or other request (e.g., by the user and/or the server 208). Then for example, the preconfigured code may create the canvas 108 on the client 202.

At step 306, a DOM tree of the webpage may be traversed. As referenced above, the DOM 104 may be used to render the webpage 102 in the browser 204. According to an example embodiment, code such as JavaScript® code may be provided by the server 208 to the client 202 over the network 206. This code may then traverse the DOM 104 of the webpage 102. Traversing the DOM 104 may include stepping through the DOM nodes 106A-F to determine which DOM nodes 106A-F correspond to screen elements.

According to an example embodiment, traversing the DOM 104 may include determining whether images are used on the webpage 102 based on corresponding DOM image nodes (e.g., 106D and 106E) existing in the DOM 104. If it is found that images are used on the webpage 102, the code may then request the images. For example, the code may request the images from the server 208. There may be two kinds of images that are used on the webpage 102, same-domain images and cross-domain images.

Same-domain images may include those images that exist on or with the same domain as the webpage 102. For example, if the webpage 102 was being provided by google.com, then a same-domain image may be found on a google.com server, perhaps under a subdirectory such google.com/private/directory/images. Hence the images may reside within the same domain as the webpage 102.

Cross-domain images may include those images that do not exist on or with the same domain as the webpage 102 (e.g., all the images that are not same-domain images). For example, if the webpage 102 was being provided by google.com, then a cross-domain image may be have been pulled from or otherwise exist on a different server, such as from espn.com. Then for example, with cross-domain images, the images may exist and be retrieved or requested from the foreign server on which they reside. A servlet (e.g., Java® servlet) or other proxy may be used to retrieve the cross-domain images used in the webpage 102 and store them for later use. For example, in those portions of the DOM 104 where a reference or call is made to a cross-domain image (e.g., on espn.com), a proxy servlet may be located on the google.com domain. Then for example, when the image from the foreign server is called by client code, the proxy servlet may request the image from the foreign server, and the image may be rendered.

Cross-domain images, unlike same-domain images, may need to be retrieved from their foreign server(s) prior to being rendered in the screenshot 110 because the cross-domain nature of the images may cause a security exception with the canvas 108. However, by retrieving the cross-domain images prior to rendering the screenshot 110, and storing the images and using a proxy address, when the screenshot 110 of the webpage 104 is rendered on the canvas 108, the security exception may be avoided. According to an example embodiment, the images may be stored locally in a random access memory (RAM). Or for example, the images may be downloaded from an image proxy, and converted to an encoded string (e.g., a base-64 encoded string) and may exist as variables within a JavaScript® or other scripting program being run.

According to an example embodiment, the canvas 108 used to draw or render the screenshot 110 may not exist on the same-domain as the webpage 102. Then for example, an iFrame element (e.g., from HTML) may be used, where one or more frames may be used for the canvas 108. The canvas 108 may then be rendered and/or otherwise displayed in the corresponding frame(s) of the iFrame element. However, whether or not the canvas 108 is rendered using an iFrame element may not make any visual difference to a user who is viewing the screenshot 110 on the browser 204.

After retrieving whatever images may exist in the DOM 104, the system (e.g., 200) may then traverse the DOM 104 node by node (e.g., 106A-F). At step 308, a property for a respective node may be identified. For example, the property for DOM node 106A may be identified. As discussed above, the property may include any number of visual and/or display properties corresponding to how the image or text element is to be rendered. For example, the properties may include size, location, font, color, texture and/or other properties. In an example embodiment, the DOM nodes 106A-F may include a significant number of properties only a few of which may be used and/or retrieved to render the screenshot 110 on the canvas 108.

At step 310, data may be rendered in the respective node on the canvas based on the property. For example, after identifying the property of a DOM node, the corresponding screen element may be rendered on the canvas 108 as the screenshot 110. This rendering may include a rendering of both the text elements and the image elements as they correspond to the DOM nodes 106A-F being traversed. The rendered screenshot 110 of the webpage 102 may then be used by the website host, for example, to identify, correct and/or otherwise analyze the error encountered by the user.

According to an example embodiment, additional steps may be performed to render the text elements of the screenshot 110. The text elements may require additional steps because the canvas 108 may not allow the system 200 to wrap text when rendering the screenshot 110 of the webpage 102. To overcome this limitation of the canvas 108, the system 200 may use, for example, an additional algorithm or other sequence of steps. According to an example embodiment, the system 200 may use one or more of two algorithms, a locate lines algorithm and/or a locate words algorithm. The locate lines algorithm may for example be used with a certain type of browser (e.g., Chrome®, Safari® and Firefox®), which has a canvas API (application programming interface). While the locate words algorithm may be used with another type of browser (e.g., Internet Explorer®) which may not support the canvas API but may support another text API such as TextRange API.

Using the locate lines algorithm, the system 200 may determine (e.g., from the property of a DOM node 106) the size of a text box corresponding to a text element and the size of the text being used within the text box. One example embodiment of this would be to use a canvas method, such as canvas.measureText, the system 200 may determine the width of text (in pixels). The system 200 may then determine the width of the box as it relates to the size of the text. For example, the system 200 may try inserting longer and longer lines of text to determine the box's width (without displaying the trial text on the canvas 108 so it may be visible to the user). The system 200 may then render the text element in the appropriate text box and wrap, or otherwise rendering the next text on the following line based on the determined width of the text box and width of the text. This may be reason why the screenshot 110 may be an approximation of the webpage 102, and not an exact replica. There may be some slight variation in the width lengths as determined due to the more restrictive nature of rendering the screenshot 110 in canvas 108.

Using the locate words algorithm, the system 200 may create ranges of text on the canvas 108. A range of text may include a beginning and an end. Using the locate words algorithm, the system 200 may place one word on the canvas 108 at a time, until the end of the respective text box and/or canvas 108 is reached, at which point the system 200 may continue placing words on the next line. This may be another reason why the screenshot 110 may be an approximation of the webpage 102, and not an exact replica. There may be some slight variation in the width lengths as determined due to the more restrictive nature of rendering the screenshot 110 in canvas 108.

As shown in the method 300, after data has been rendered in step 310, the method may loop back to step 308 to identify a property of the next node. The steps 308 and 310 may repeat until the processing has completed, at which point the method 300 ends.

Figure 4A:
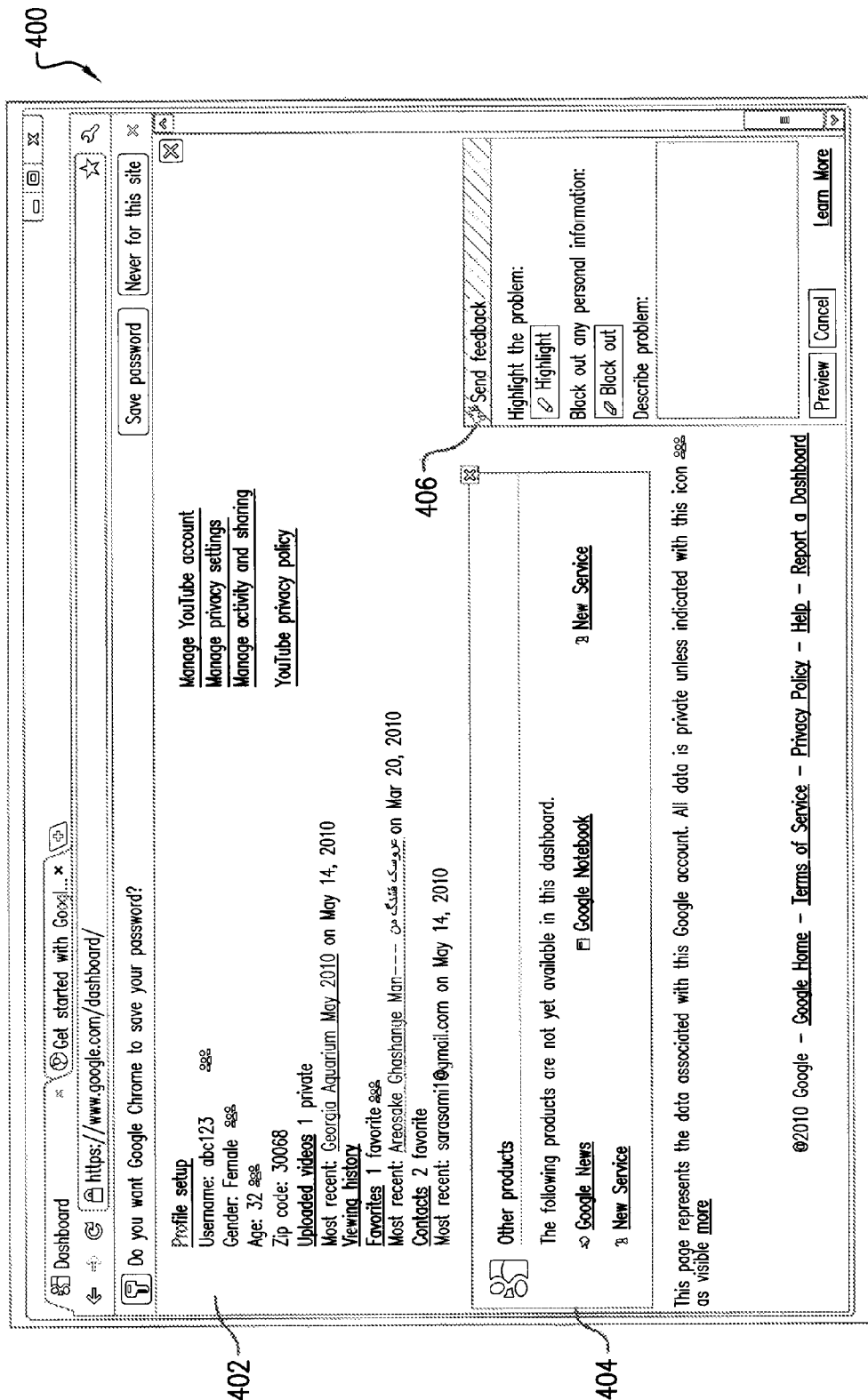
FIG. 4A illustrates an example implementation of a webpage.

FIG. 4A illustrates an example implementation of a webpage 400. In the example webpage 400 of FIG. 4A, the screen may be illustrated as including a grayed area 402 and a highlighted area 404. For example, a user may be viewing the webpage 400 and may have a problem with the section 404. Then for example the user may indicate that there is a problem with the webpage 400. Upon receiving this notification, the system (or webhost) may allow the user to select with which portion(s) of the webpage 400 the user is having an issue. Then for example, the user may select the portion 404 and the section 402 may be grayed as shown in the webpage 400.

According to an exemplary embodiment, the system may also provide the user with a feedback box 406, where the user may manually enter a description of the problem the user is experiencing. The feedback box 406, along with the user's description and rendered screenshot of the webpage 400 may then be provided to the webhost or other system for troubleshooting the user's issue(s).

Figure 4B:
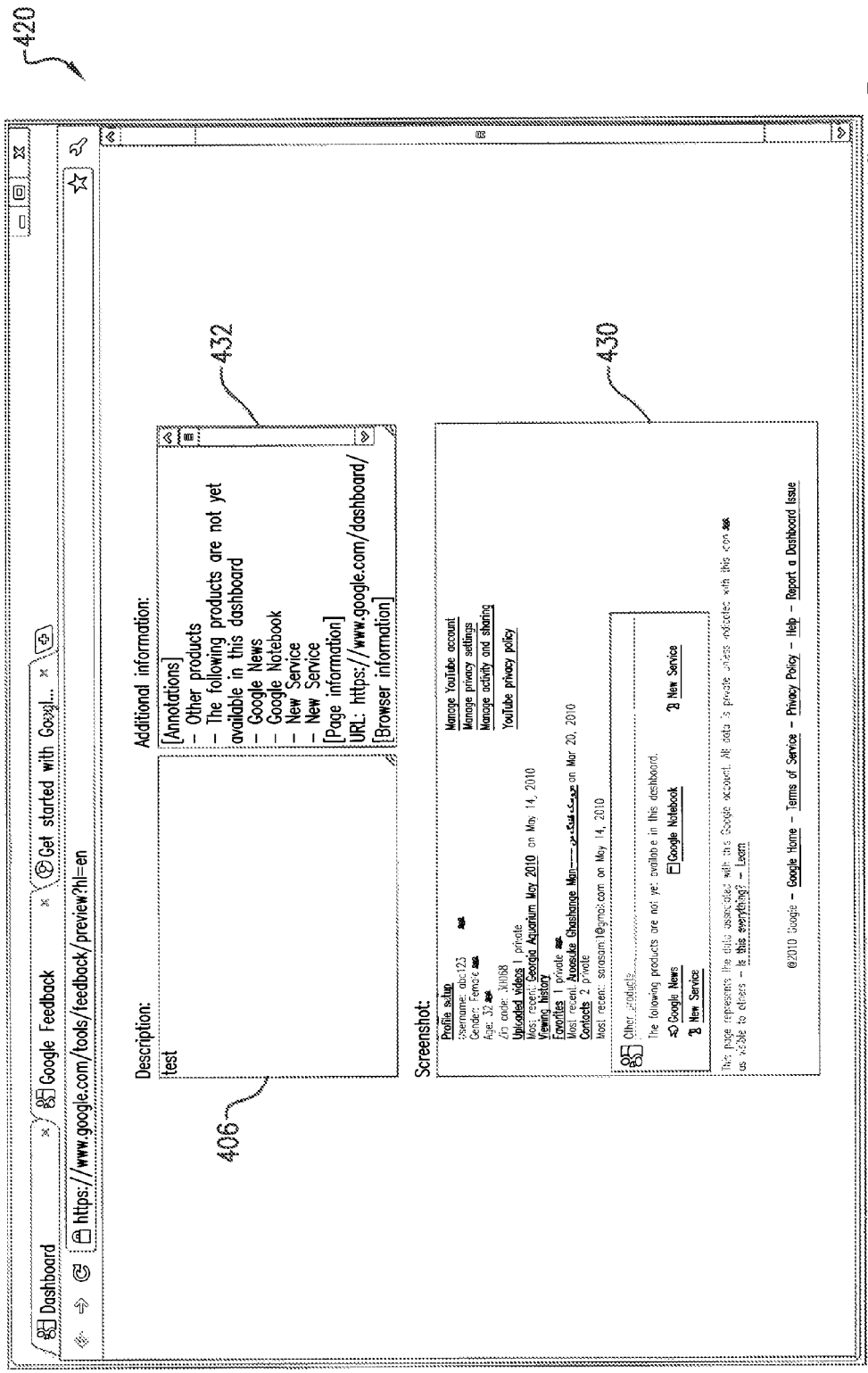
FIG. 4B illustrates an example implementation of using a screenshot.

FIG. 4B illustrates an example implementation of using a screenshot. In the example implementation 420 of FIG. 4B, may include the corresponding screenshot 430 of the webpage 400 (of FIG. 4A). As may be seen, the screenshot 420 may account for the selected 404 and unselected 402 portions of the webpage 400. The implementation 420 may also include the description box 406 where the user may have optionally entered text describing the issue(s) the user was experiencing and/or describing the screenshot 400. The implementation may also include an additional information box 432. The additional information box 432 may be used to include additional information that may have been gathered or captured by the system, network 206 and/or server 208 providing the webpage 400. Then for example, the implementation 420 may then be provided to troubleshoot or otherwise address the issue(s) regarding the webpage 400. According to an example embodiment, the implementation, including the screenshot 430, may be generated in a new browser tab.

Figure 5:
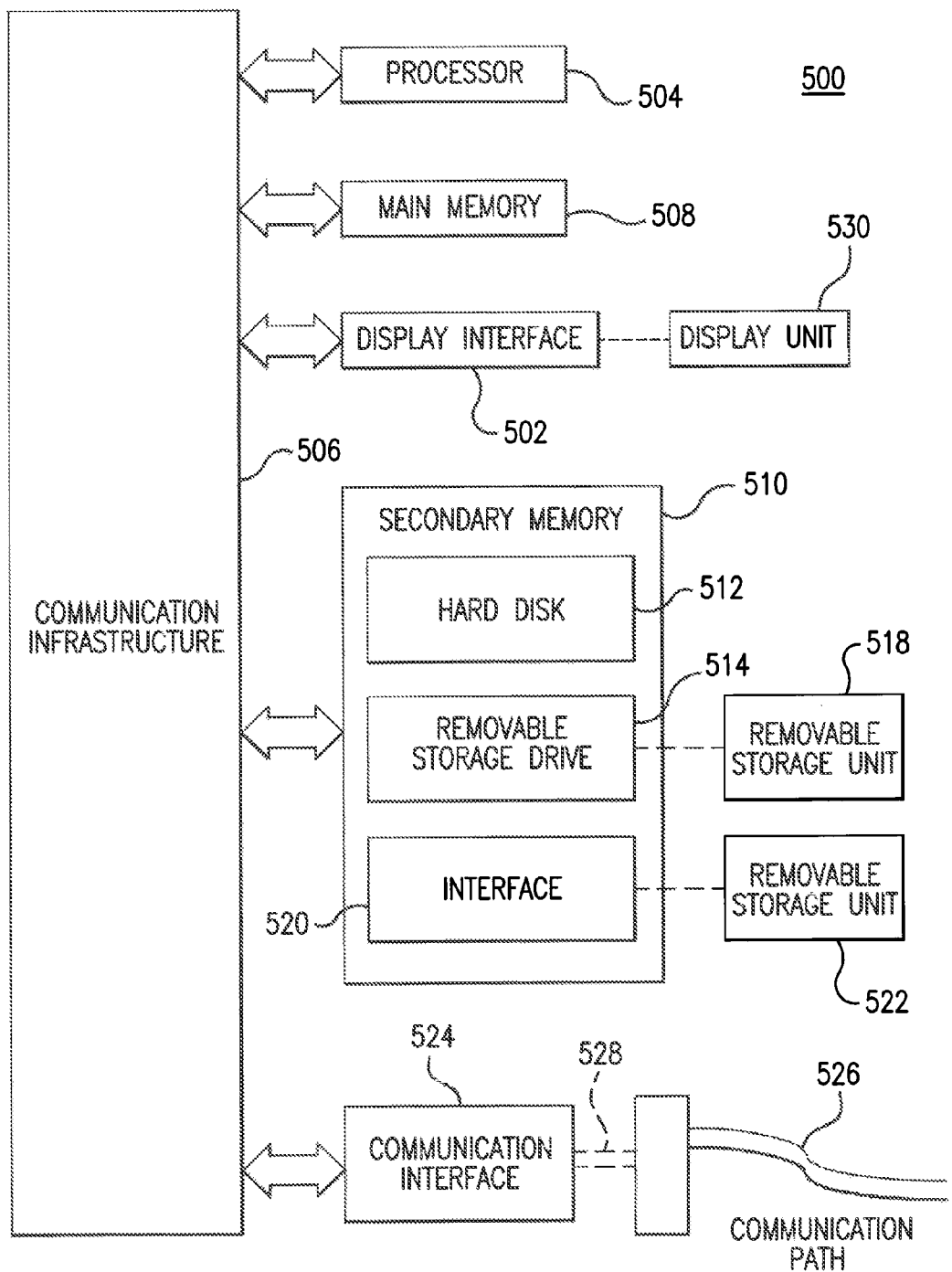
FIG. 5 is an example system diagram that can be used to embody or implement embodiments, or portions thereof, described herein.

FIG. 5 is an example system 500 diagram that can be used to embody or implement embodiments, or portions thereof, described herein. For example, the client 202 and/or server 208 may be implemented in computer system 500, or another system similar thereto, using hardware, software, firmware, tangible computer readable media having instructions stored thereon, or a combination thereof and may be implemented in one or more computer systems or other processing systems. Hardware, software, or any combination of such may embody any of the modules, procedures and components in FIGS. 1-4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general-purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. which is read by and written to by removable storage drive 514. As will be appreciated by persons skilled in the relevant art, removable storage unit 518 includes a computer usable storage medium having stored therein computer software and/or data.

Computer system 500 (optionally) includes a display interface 502 (which may include input and output devices such as keyboards, mice, etc.) that forwards graphics, text, and other data from communication infrastructure 506 (or from a frame buffer not shown) for display on display unit 530.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement the present invention as discussed herein. In particular, the computer programs, when executed, enable processor device 504 to implement the processes of the present invention, such as the stages in the method illustrated by the flowchart in FIG. 6 discussed below. Accordingly, such computer programs represent controllers of the computer system 500. Where the invention is implemented using software, the software may be stored in a computer program product and loaded into computer system 500 using removable storage drive 514, interface 520, and hard disk drive 512, or communications interface 524.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method comprising:
receiving at a client device, an indication to render a screenshot of a webpage presented on the client device;
determining that one or more images are presented on the webpage; and
for each image, determining whether an image is on a same domain as the webpage;
identifying the image data from the respective image if the respective image is on the same domain; and
using an image proxy to identify the image data of the respective image if the respective image is not on the same domain;
creating at the client device, a canvas;
traversing a document object model (DOM) of the webpage;
for each of one or more nodes in the DOM:
identifying a property of a respective node; and
rendering data in the respective node on the canvas based on the property,
wherein the data includes the image data if one or more images are presented on webpage.

2. The computer-implemented method of claim 1, further comprising:
loading an iFrame into the webpage.

3. The computer-implemented method of claim 1, wherein identifying a property of a respective node comprises:
identifying the property based on a cascading style sheet (CSS) property associated with the respective node.

4. The computer-implemented method of claim 1, wherein the property is one of a background color, a border, a background image, a text formatting, or a positioning property.

5. The computer-implemented method of claim 1, wherein the canvas is one of an HTML CanvasElement or a FlashCanvas.

6. A computer storage medium encoded with a computer program, the program comprising instructions that when executed by one or more computers cause the one or more computers to perform operations comprising:
- receiving at a client device, an indication to render a screenshot of a webpage presented on the client device;
- determining that one or more images are presented on the webpage; and
- for each image, determining, whether an image is on a same domain as the webpage;
- identifying the image data from the respective image if the respective image is on the same domain; and
- using an image proxy to identify the image data of the respective image if the respective image is not on the same domain;
- creating at the client device, a canvas;
- traversing a document object model (DOM) of the webpage;
- for each of one or more nodes in the DOM:
    - identifying a property of a respective node; and
    - rendering data in the respective node on the canvas based on the property, wherein the data includes the image data if one or more images are presented on webpage.

7. The computer storage medium of claim 6, wherein the operations further comprise:
- loading an iFrame into the webpage.

8. The computer storage medium of claim 6, wherein identifying a property of a respective node comprises:
- identifying the property based on a cascading style sheet (CSS) property associated with the respective node.

9. The computer storage medium of claim 6, wherein the property is one of a background color, a border, a background image, a text formatting, or a positioning property.

10. The computer storage medium of claim 6, wherein the canvas is one of an HTML CanvasElement or a FlashCanvas.

11. A system comprising:
- one or more computers; and
- a computer-readable medium coupled to the one or more computers having instructions stored thereon which, when executed by the one or more computers, cause the one or more computers to perform operations comprising:
    - receiving at a client device, an indication to render a screenshot of a webpage presented on the client device;
    - determining that one or more images are presented on the webpage; and
    - for each image, determining whether an image is on a same domain as the webpage;
    - identifying the image data from the respective image if the respective image is on the same domain; and
    - using an image proxy to identify the image data of the respective image if the respective image is not on the same domain;
    - creating at the client device, a canvas;
    - traversing a document object model (DOM) of the webpage;
    - for each of one or more nodes in the DOM:
        - identifying a property of a respective node; and
        - rending data in the respective node on the canvas based on the property, wherein the data includes the image data if one or more images are presented on webpage.

12. The system of claim 11, wherein the operations further comprise:
- loading an iFrame into the webpage.

13. The system of claim 11, wherein identifying a property of a respective node comprises:
- identifying the property based on a cascading style sheet (CSS) property associated with the respective node.

14. The system of claim 11, wherein the property is one of a background color, a border, a background image, a text formatting, or a positioning property.

* * * * *